United States Patent

Doi et al.

[11] Patent Number: 6,124,965
[45] Date of Patent: Sep. 26, 2000

[54] OPTICAL ELEMENT AND LIGHT SHUTTER DEVICE USING THE SAME

[75] Inventors: Isao Doi, Toyonaka; Itaru Saito, Nishinomiya; Kenichi Wada, Takatsuki, all of Japan

[73] Assignee: Minolta Co., Ltd., Osaka, Japan

[21] Appl. No.: 09/352,892

[22] Filed: Jul. 14, 1999

[30] Foreign Application Priority Data

Jul. 15, 1998 [JP] Japan .................................. 10-199910

[51] Int. Cl.$^7$ ....................................................... G02F 1/03

[52] U.S. Cl. ......................... 359/248; 359/245; 359/246; 359/254; 359/290; 359/295; 359/315; 257/17

[58] Field of Search .................................. 359/245, 246, 359/248, 254, 290, 295, 315, 316, 322, 323; 257/17; 348/790; 430/1

[56] References Cited

U.S. PATENT DOCUMENTS

| | | | |
|---|---|---|---|
| 5,274,246 | 12/1993 | Hopkins et al. | 257/17 |
| 5,396,363 | 3/1995 | Valette | 359/248 |
| 5,745,280 | 4/1998 | Kitano | 359/290 |
| 5,801,872 | 9/1998 | Tsuji | 359/248 |
| 5,808,314 | 9/1998 | Nakajima et al. | 257/17 |
| 6,055,087 | 4/2000 | Kwon et al. | 358/248 |
| 6,057,955 | 5/2000 | Yamamoto | 359/254 |
| 6,061,165 | 5/2000 | Romanovsky | 359/245 |

*Primary Examiner*—Loha Ben
*Attorney, Agent, or Firm*—McDermott, Will & Emery

[57] ABSTRACT

Disclosed is a light shutter device comprising a plurality of optical element for modulating light passing therethrough. Each optical element is made of PLZT and the surface of a light modulating region of each optical element is coated with a thin film. The surface electrical resistance on the thin film is $10^{10}$ Ω/sq or less.

14 Claims, 3 Drawing Sheets

OPTICAL ELEMENT AND LIGHT SHUTTER DEVICE USING THE SAME

This application is based on Japanese Patent Application No.HEI10-199910 filed in Japan, the contents of which are hereby incorporated by reference.

BACKGROUND OF THE INVENTION

1. Field of the Invention

The present invention pertains to an optical element and a light shutter device using the same, and more particularly, to an optical element made of a material having an electro-optical effect, such as PLZT, and a light shutter device using the optical element as a light shutter element.

2. Description of the Related Art

Conventionally, as a light shutter device that forms an image (a latent image) on photographic paper or film using a silver photosensitive material or a photosensitive drum for electronic photography, a device that uses a material having an electro-optical effect, such as PLZT, has been known. Such a light shutter device includes at lease one light shutter element. A light shutter element has a construction in which drive electrodes (a common electrode and an individual electrode) are placed on a chip comprising PLZT, and the area sandwiched by these electrodes is deemed a light modulation region equivalent to one pixel.

Incidentally, the method by which to resolve hysterisis is an important issue in a light shutter device of this type. Hysterisis is the reduction in contrast as the light shutter element is used over time. This phenomenon is presumed to occur due for the following reason. In an electro-optical material, a minute amount of electric charge occurs in areas exposed to light in an environment where an electric field is present. This electric charge accumulates as the exposure to light is repeated. As a result of the accumulation of electric charge, a space electric field is formed inside the light shutter element. This space electric field tends to exist near the electrodes and changes the optimal drive voltage (half-wavelength voltage). It therefore reduces the amount of permeating light while voltage application is ON. The space electric field also increases the amount of leaking light while voltage application is OFF. Consequently, the image contrast decreases as time passes.

To combat this phenomenon, it is conventionally known that light modulation regions should be partially processed (reduced) to change their properties such that their electrical resistance will be reduced (see U.S. Pat. No. 5,745,280, for example). However, this is problematic in that changing the properties of the element itself involves a relatively complex process and that it is difficult to control the level of resistance.

SUMMARY OF THE INVENTION

The object of the present invention, therefore, is to provide a light shutter device that can effectively resolve hysterisis and that can be made with high precision using a simple manufacturing process.

In order to achieve this object, in the light shutter device of the present invention, a thin film is formed on the surface of the light modulation region and the surface electrical resistance on the thin film is $10^{10}$ $\Omega$/sq or less.

It is presumed that by having the surface electrical resistance be $10^{10}$ $\Omega$/sq or less, the electric charge remaining in the light modulation regions is gradually expelled toward the electrodes through the thin film and the remaining electric field will disappear. This eliminates the hysterisis and prevents the reduction in contrast over time. In addition, because the present invention does not aim to improve the properties of the electro-optical element itself, but simply forms a thin film on the chip, manufacturing is easy and the desired resistance level may be obtained with high accuracy.

These and other objects, advantages and features of the invention will become apparent from the following description thereof taken in conjunction with the accompanying drawings which illustrates a specific embodiment of the invention.

DETAILED DESCRIPTION OF THE PREFERRED EMBODIMENTS

The embodiments of the light shutter device pertaining to the present invention are explained below with reference to the attached drawings.

Construction

Figure 1:
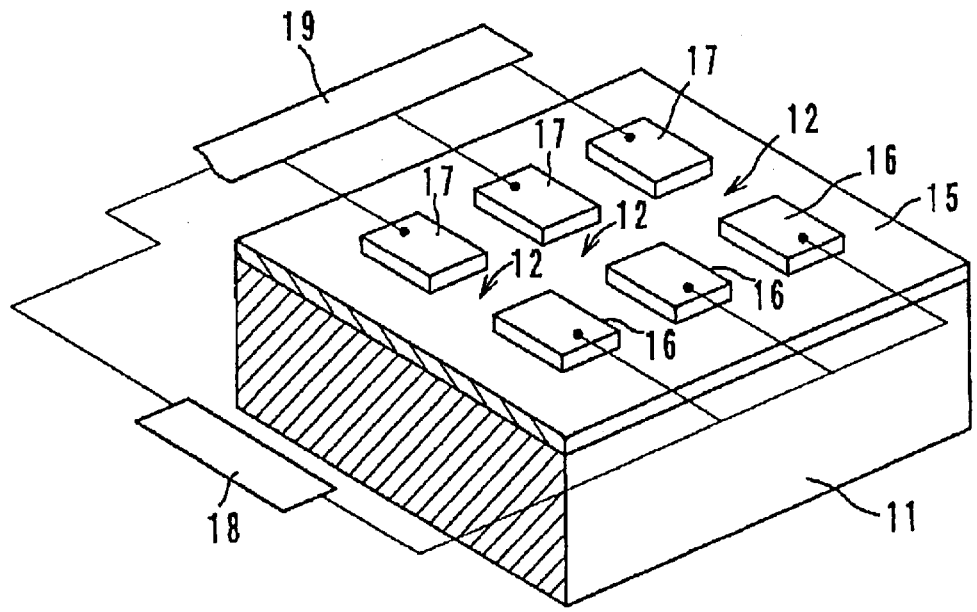
FIG. 1 is a perspective view showing a light shutter device comprising the first embodiment of the present invention.

FIG. 1 shows a light shutter device comprising the first embodiment. In this device, a light-permeable and conductive thin film 15 is formed on the surface of a light shutter chip 11 comprising PLZT, and a common electrode 16 and individual electrodes 17 are formed on the thin film 15. The number 18 indicates the power supply and the number 19 indicates a drive circuit. In this drawing, only one chip 11 is shown, but in reality, a number of chips are aligned in a straight line to form an array. On either side of the chip 11 (the top and bottom surfaces in the drawing) are located a polarizer and an analyzer (not shown in the drawing) which are placed in Cross-Nicoled arrangement relative to the chip. A light modulation region is defined by means of an electrode 16 and an electrode 17. There are three light shutter elements for each chip 11 in this example.

PLZT is light-permeable ceramic having an electro-optical effect with a large Kerr constant. When an electric field is formed, double refraction takes place in the PLZT itself, as a result of which the polarization surface of the light passing through the PLZT rotates. Therefore, by turning ON and OFF the application of voltage to the area between the electrodes 16 and 17 based on the image data, the double refraction in the light modulation regions changes, switching the permeating light ON and OFF in accordance with the image data.

Figure 2:
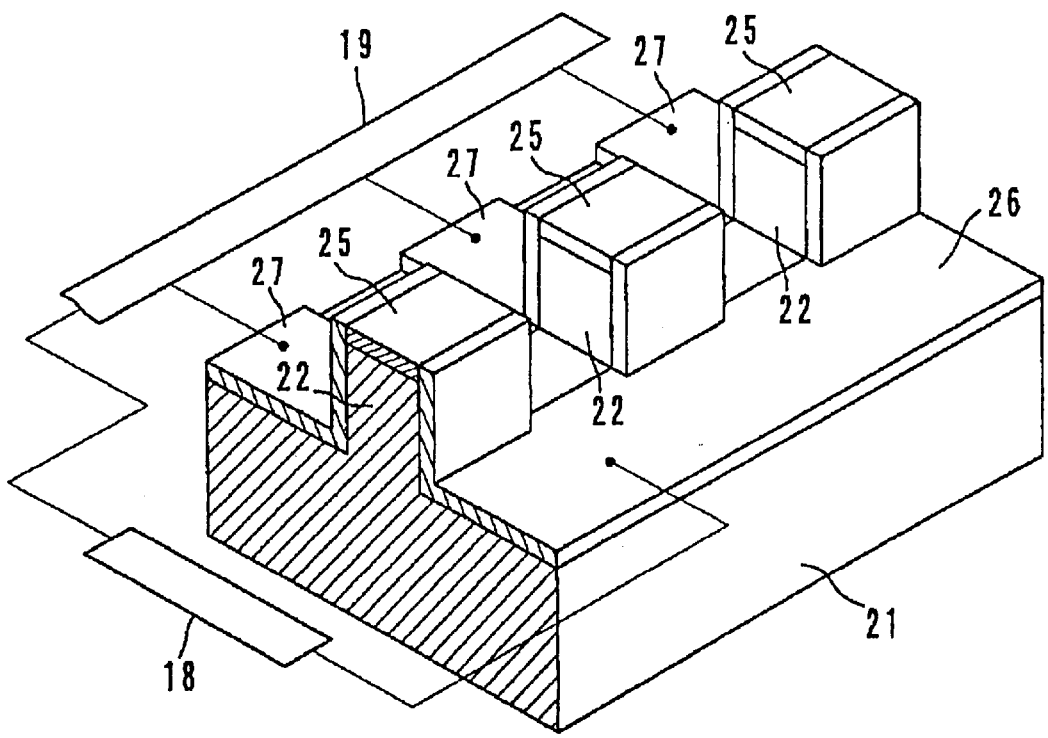
FIG. 2 is a perspective view showing a light shutter device comprising the second embodiment of the present invention.

FIG. 2 shows a light shutter device comprising the second embodiment of the present invention. In this device, a light-permeable and conductive thin film 25 is formed on the surface of a light shutter chip 21 comprising PLZT, and protrusions are subsequently formed at certain fixed intervals such that a common electrode 26 and an individual electrode 27 are formed on either side of each protrusion. In this embodiment, the areas sandwiched by the common electrode 26 and the individual electrodes 27, i.e., the areas comprising the protrusions, are defined as light modulation regions 22.

The same power supply 18 and drive circuit 19 used in FIG. 1 are used. The functions of the light shutter elements are also the same as in the device shown in FIG. 1.

Effect of the thin film and surface electrical resistance

The thin films 15 and 25 described above have the effect of reducing the surface electrical resistance between the drive electrodes. It is presumed that this effect is possible due to the events explained below. Where the thin film 15 or 25 is not present, if application of voltage is repeated over an extended period of time to the areas between the electrodes 16 and 17 or between the electrodes 26 and 27, electric charge remains in the light modulation regions 12 or 22. However, where a thin film 15 or 25 is present, the electric charge is gradually expelled toward the grounded electrode (the common electrode 16 or 26) from the light modulation regions 12 or 22 via the thin film 15 or 25. Consequently, as a practical matter, electrical charge does not accumulate in the light modulation regions 12 or 22. As a result, the occurrence of hysterisis is prevented and the reduction in contrast as time passes does not take place.

As shown in the experiment examples below, it is preferred that the surface electrical resistance Rs between the drive electrodes be $10^{10}$ $\Omega$/sq or less. The lower limit of the surface electrical resistance is determined based on the current load of the drive circuit 19 and is ordinarily $10^4$ $\Omega$/sq. Here, the surface electrical resistance is also termed area resistance or sheet resistance, and is sought based on Equation (1) shown below after forming on the surface of the element a pair of thin film electrodes that face each other over a distance L and have a width W, and detecting the current I that flows when a voltage V is applied to the area between these electrodes.

$$Rs=(W \cdot V/I)L \tag{1}$$

Material and thickness of the thin film

For the material of the thin film, a semiconductive metal oxide may be used, such as tin oxide to which indium is added, or zinc oxide or titanium oxide to which aluminum is added. Alternatively, a material which is made conductive by dispersing a conductive high polymer such as polyacethylene, polypyrrole or polythyophene in a plastic film material may be used. This plastic film material may comprise polyethylene, polypropylene, ionomer, polyvinyl alcohol, polyvinyl acetate, ethylene vinyl acetate copolymer, poly-4-methylpentene-1, polymethyl methacrylate, polycarbonate, polystyrene, acrylonitrile methyl acrylate copolymer, acrylonitrile-butadiene-styrene copolymer, ethylene polyterephthalate, polyurethane elastomer, nitrocellulose, cellulose acetate, cellulose triacetate, cellulose propionate, cellulose acetate butyrate, ethyl cellulose, recycled cellulose, nylon 6, nylon 66, nylon 11, nylon 12, polyimide, polysulfone, polyether sulfone, polyvinyl chloride, vinyl chloride vinyl acetate copolymer, polyvinylidene chloride, vinylidene chloride vinyl chloride copolymer, vinyl nitrile rubber alloy, polytetrafluoroethylene, polychlorotrifluoroethylene, polyvinyl fluoride, polyvinylidene fluoride, or polyethylene tetrafluoroethylene copolymer.

The thin film should have a thickness such that it is light-permeable to an acceptable extent and enables close adhesion with the electro-optical material but is strong enough to allow sufficient handling and durability. Normally, this range is between approximately 0.01 $\mu$m to 5 $\mu$m.

Film forming method

So long as a prescribed surface electrical resistance is given to the thin film, any film forming method may be used. It is preferred, however, that a thin film vacuum forming method be used, such as vacuum deposition, sputtering, ion plating, light CVD, heat CVD or plasma CVD, using gas of a metal or a metal oxide, or of a silicon compound, a boron compound, a phosphorus compound, a hydrocarbon compound or an organic metal. The surface electrical resistance may be controlled based on the amount of the impurity or the conductive high polymer added, the temperature of the substrate during film formation, or the oxygen partial pressure.

Alternatively, a coating method such as immersion, spraying, bar coating, curtain flow, electrodeposition or roller coating may be used. Where a coating method is used, the surface electrical resistance may be controlled based on the amount of conductive high polymer added.

In order to ensure adhesion between the electro-optical material and the thin film, the electro-optical material may undergo pre-treatment prior to the formation of the thin film. For example, a silane coupling agent or a primer layer may be applied, or acid treatment, alkali treatment or plasma treatment may be performed. In any event, it is preferred that the pre-treatment be applied to the extent that the electrical resistance will not change as a practical matter.

Another example of pre-treatment would be roughening the surface of the electro-optical material. Specifically, puff polishing, sand blasting or machining may be used to make the surface rough. The roughening must be stopped before the amount of permeating light decreases significantly or becomes non-uniform.

Further, in order to improve the durability and the environmental resistance of the thin film, a surface protecting layer may be applied. Alternatively, an undercoating layer may be used in order to improve the light shutter performance and adhesion. For the material of the surface protecting layer or the undercoating layer, a vacuum thin film comprising a resin such as a UV-hardened resin, a room temperature-hardened resin or a heat-hardened resin, a mixed resin comprising any of the previous resins but in which a resistance adjusting material is dispersed, a metal oxide or a metal sulfate made into a thin film using vacuum vapor deposition or vacuum ion plating, or undefined carbon film or undefined silicon carbide film formed by means of plasma copolymerization may be used. Where a protecting layer is used, the outermost surface of the light shutter element comprises the protecting layer surface, but the surface electrical resistance in the present invention is not the resistance of the protecting layer but that of the thin film.

Specific example of manufacturing method

A specific example of the manufacturing method of the light shutter device is explained below. The explanation here is based on the planar type first embodiment shown in FIG. 1.

First, a chip 11 of a prescribed size was washed, and an $SnO_2$ film 15 to which indium was added as an impurity was formed on the surface of the chip by means of sputtering such that the film thickness would be 0.1 $\mu$m. When the surface electrical resistance of the thin film 15 was measured using the method described above, the reading was $3 \times 10^7$ $\Omega$/sq. The surface electrical resistance of the chip 11 itself, which was measured using the same method, was $6 \times 10^{12}$ $\Omega$/sq in this case, indium was used to adjust the surface electrical resistance.

An aluminum film that would comprise the electrodes 16 and 17 was formed on the thin film 15 by means of sputtering such that the film thickness would be 0.3 μm. Further, the common electrode 16 and individual electrodes 17 were formed into the prescribed configurations by means of photolithography.

Figure 3:
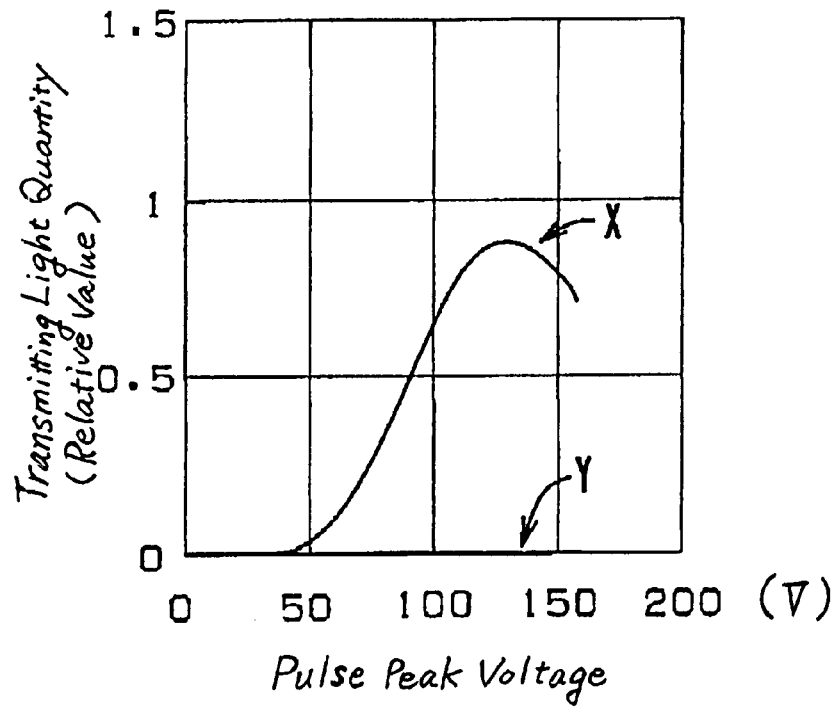
FIGS. 3(A) and 3(B) are graphs showing the characteristic regarding the amount of permeating light relative to the voltage applied in the first embodiment, wherein the graph of FIG. 3(A) shows the characteristic in the beginning stage, and the graph of FIG. 3(B) shows the characteristic after an excessive strain test.
Figure 3:
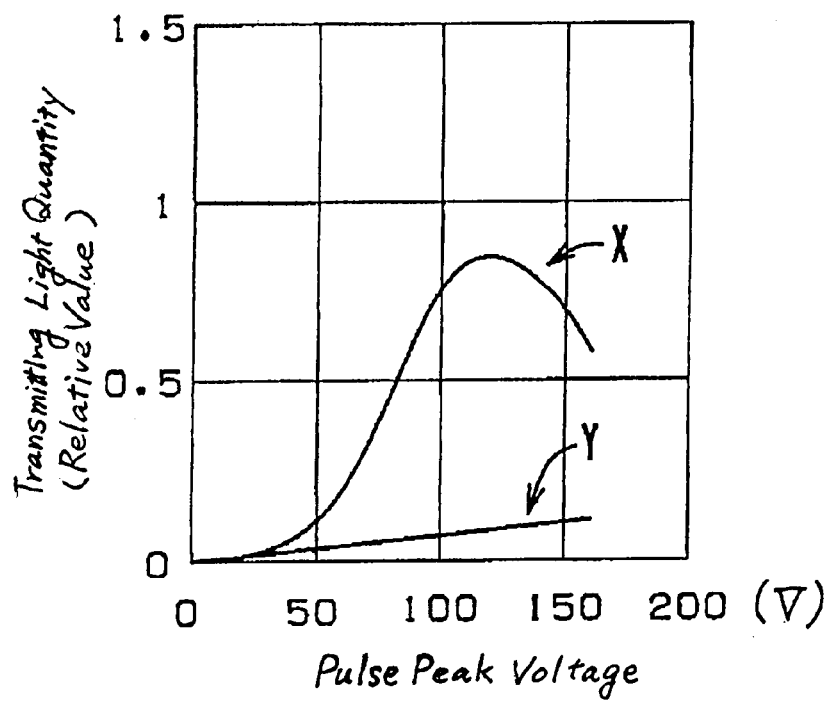

FIGS. 3(A) and 3(B) show the characteristic of the light shutter device manufactured in this fashion when driven using a 1 kHz rectangular pulse voltage having a 1:1 duty ratio. In each drawing, the curved line $X_1$ represents the light amount when voltage application was ON, and the curved line $Y_1$ represents the light amount when voltage application was OFF. FIG. 3(A) shows the characteristic in the beginning stage, where the contrast is good. FIG. 3(B) shows the characteristic that was obtained after performance of the excessive strain test, in which a DC voltage equal to the pulse peak voltage was applied on a continuous basis for eight hours. Although the contrast is slightly lower than in the initial characteristic, this does not pose any problem as a practical matter.

Figure 4:
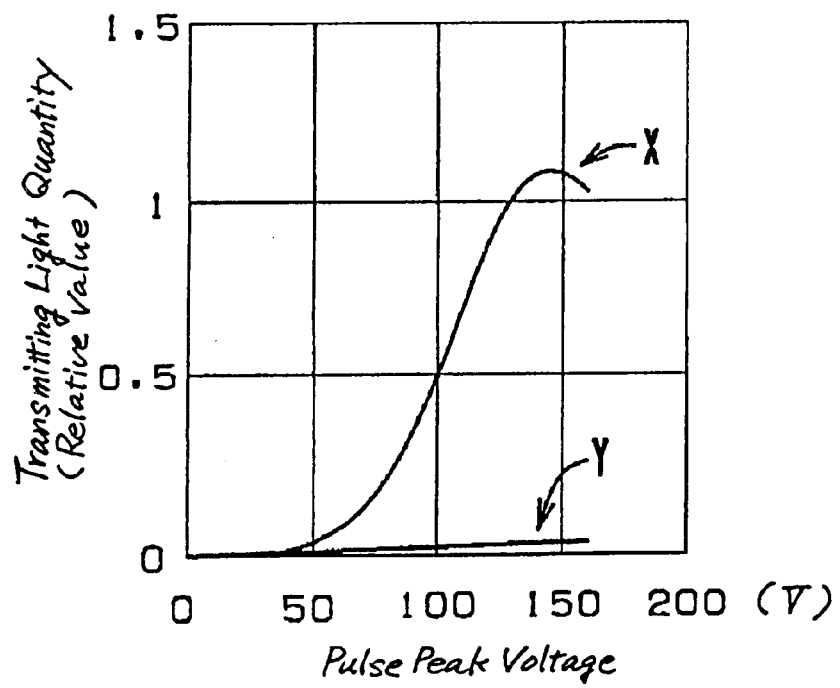
FIGS. 4(A) and 4(B) are graphs showing the characteristic regarding the amount of permeating light relative to the voltage applied in the second embodiment, wherein the graph of FIG. 4(A) shows the characteristic in the beginning stage, and the graph of FIG. 4(B) shows the characteristic after an excessive strain test.
Figure 4:
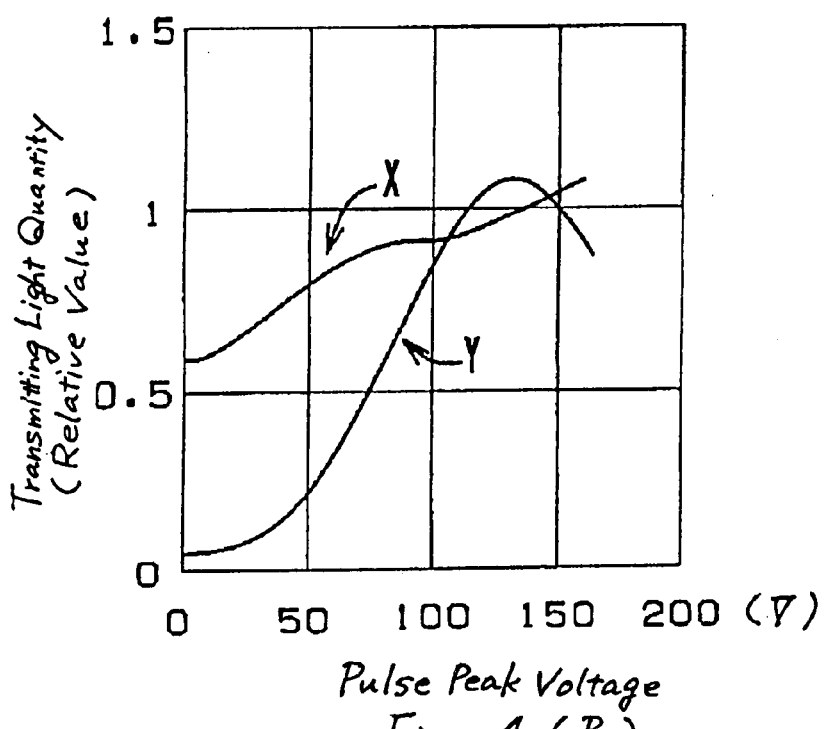

FIGS. 4(A) and 4(B) show, as a comparison example, the characteristic of a light shutter device that did not include the thin film 15 and was driven using the same conditions as in the previous test. In each drawing, the curved lines $X_2$ and $Y_2$ represent the light amount when voltage application was ON and when voltage application was OFF, respectively. FIG. 4(A) shows the initial characteristic, while FIG. 4(B) shows the post-excessive strain test characteristic. As shown in FIG. 4(B), in the comparison example, the contrast decreased significantly after the excessive strain test.

Experiment examples 1 through 6, which were based on the first embodiment but were given different thin film thicknesses and different amounts of added indium in order to achieve various surface electrical resistance levels, and an experiment example 7, which did not include a thin film, were then created. Their contrast is shown in Table 1 below. The contrast in Table 1 was sought as the ratio of the light amount when application of half-wavelength voltage was ON to the light amount when voltage application was OFF after the excessive strain test.

In the result column, a circle indicates a result in which the contrast was 50 or higher, comprising a highly preferable practical performance. A triangle indicates a contrast between 20 and 50, which is a less preferable but still acceptable result for practical purposes. A cross indicates a contrast of 20 or lower, which is unacceptable.

TABLE 1

| Thin film material | Film thickness (μm) | Rs ($10^7 \times \Omega$/sq.) | Contrast | Evaluation result |
|---|---|---|---|---|
| Experiment 1 | SnO₂(In) | 0.1 | 3 | 80 | ○ |
| Experiment 2 | SnO₂(In) | 0.05 | 150 | 73 | ○ |
| Experiment 3 | SnO₂(In) | 0.12 | 550 | 65 | ○ |
| Experiment 4 | SnO₂(In) | 0.1 | 0.25 | 250 | ○ |
| Experiment 5 | SnO₂(In) | 0.1 | 900 | 30 | Δ |
| Experiment 6 | SnO₂(In) | 0.1 | 1200 | 15 | X |
| Experiment 7 | — | — | 700000 | 11 | X |

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An optical element made of a material having an electro-optical effect, said optical element having a light modulating region, wherein a thin film is formed on a surface of the light modulating region and the surface electrical resistance on the thin film is $10^{10}$ Ω/sq or less.

2. The optical element as claimed in claim 1, wherein the surface electrical resistance on the thin film is $10^4$ Ω/sq or more.

3. The optical element as claimed in claim 1, wherein the thin film comprises semiconductive metal oxide.

4. The optical element as claimed in claim 3, wherein the semiconductive metal oxide comprises tin oxide to which indium is added, zinc oxide to which aluminum is added, or titanium oxide to which aluminum is added.

5. The optical element as claimed in claim 1, wherein the thin film comprises plastic film material to which a conductive high polymer is added.

6. The optical element as claimed in claim 1, the thin film has a thickness in a range from 0.01 μm to 5 μm.

7. The optical element as claimed in claim 1, wherein the light modulating region is defined by a pair of electrodes.

8. A light shutter device including at least one optical element made of a material having an electro-optical effect, said optical element having a light modulating region, wherein a thin film is formed on a surface of the light modulating region and the surface electrical resistance on the thin film is $10^{10}$ Ω/sq or less.

9. The light shutter device as claimed in claim 8, wherein the surface electrical resistance on the thin film is $10^4$ Ω/sq. or more.

10. The light shutter device as claimed in claim 8, wherein the thin film comprises semiconductive metal oxide.

11. The light shutter device as claimed in claim 10, wherein the semiconductive metal oxide comprises tin oxide to which indium is added, zinc oxide to which aluminum is added, or titanium oxide to which aluminum is added.

12. The light shutter device as claimed in claim 8, wherein the thin film comprises plastic film material to which a conductive high polymer is added.

13. The light shutter device as claimed in claim 8, the thin film has a thickness in a range from 0.01 μm to 5 μm.

14. The light shutter device as claimed in claim 8, wherein the light modulating region is defined by a pair of electrodes.

* * * * *